UNITED STATES PATENT OFFICE.

ARTHUR ERNEST BERNASCONI, OF COVENTRY, ENGLAND.

COMPOSITION OF MATTER TO BE USED IN THE MANUFACTURE OF IMITATION LEADED GLASS.

965,860.     Specification of Letters Patent.     Patented Aug. 2, 1910.

No Drawing.     Application filed July 31, 1909. Serial No. 510,565.

*To all whom it may concern:*

Be it known that I, ARTHUR ERNEST BERNASCONI, a subject of the King of Great Britain, and resident of Coventry, in the county of Warwick, England, have invented a new and useful Composition of Matter to be Used in the Manufacture of Imitation Leaded Glass, of which the following is a specification.

This invention relates to improvements in imitation leaded glass, and has for its object the production of a composition for forming the outlines, which when fired will unite with the glass and resemble strongly leaded outlining.

According to this invention, the composition consists of a mixture of china clay, glass flux, and black enamel. With this is mixed a little adhesive such as gum arabic by which it can be caused to adhere to the glass. The outlining may be applied to both sides of the glass, which is then fired or baked in a kiln, causing the composition used for the lines to fuse. When fired the lines harden and unite with the glass.

For the composition of the mixture of which the outlining is composed the following proportions have been found suitable:— 1 part of hard black enamel, known to the British glass trade as No. 31 F. 2 parts of china clay No. 100. 1¾ parts of glass flux known to the trade as No. 157 F. The hard black enamel above mentioned is composed of silica, potash, borax, manganese and black oxid of copper. The china clay is the best white china clay used for china. The glass flux is a compound of silica, borax, potash and lead. These are thoroughly mixed but the composition will not adhere to glass well by itself. To overcome this it is mixed with gum arabic and water, a sufficient quantity being used to enable the mixture to adhere to the glass in any desired quantity until the glass is "burnt". The gum arabic is only used as an adhesive.

In carrying out the invention a sheet of glass of any suitable kind is placed over a design, and the mixture traced on the glass over the design, in any suitable manner. For instance, it may be applied with a stick, brush, or tube. A sufficient quantity is applied to make the lines stand up, after which the glass is allowed to dry when it can be turned over and the opposite side similarly treated. When thoroughly dry the sheet of glass is placed in a cast iron tray and bedded down on a bed of plaster of paris, and is then covered by a lid, which leaves a clearance of about four inches. Thus a large body of air is interposed between the glass and the lid, enabling the firing to be effected slowly in the well-known manner.

Preferably the kiln is formed with a view hole so that the condition of the glass can be examined from time to time. As soon as the lines turn to a dark grey color the glass can be removed and it will be found that the lines have set hard, having exactly the same appearance as the partitions used in leaded glass. Conveniently the kiln is so constructed that the tray containing the glass, directly it is treated, can be removed from the back of the kiln and a fresh tray inserted and so on continuously.

In making colored glass the stains are applied to the surface of the sheet of glass either before or after the outlining has been done and preferably such stains are chosen as fuse at the same temperature as the mixture used in the lines, as has hitherto been proposed. If desired however, the proportions of the composition of the mixture may be varied to make it fuse at the temperature of the stains. The stains can be applied to either or both sides of the glass enabling different shades to be obtained.

By the use of the composition above described both sides of the glass can be treated without damage to the composition before it is burnt, or during the process of burning. It is found that with this composition the glass ready for firing may be bedded down upon plaster of paris or the like without the composition adhering to the bed. This is a point of great importance as it enables both sides of the glass to be treated equally well, and obviates the necessity for standing the glass on edge, which causes it to warp.

Obviously the rate of firing may vary according to circumstances, but preferably it is somewhat slow. Again, the composition of the mixture may be varied without departing from the invention. The above proportions have been found to effect the purpose satisfactorily.

What I claim as my invention, and desire to secure by Letters Patent is:—

1. The herein described composition of matter comprising black enamel (consisting of silica, potash, borax, manganese, and black oxid of copper), china clay, and glass flux (consisting of a compound of silica, borax, potash and lead), substantially as and for the purpose described.

2. The herein described composition of matter for imitation leaded glass, comprising black enamel (consisting of silica, potash, borax, manganese, and black oxid of copper), china clay, and glass flux (consisting of a compound of silica, borax, potash and lead), mixed with an adhesive before fusing, substantially as and for the purpose described.

In testimony whereof I have signed my name to this specification in the presence of two subscribing witnesses.

ARTHUR ERNEST BERNASCONI.

Witnesses:
JOHN I. FAZAKARLEY,
HORACE D. TINGEY.